(12) United States Patent
Major

(10) Patent No.: US 6,553,601 B1
(45) Date of Patent: Apr. 29, 2003

(54) PIPE AND CLEANING DEVICE

(76) Inventor: Michael R. Major, 128 Maple Leaf La., Shelburne, VT (US) 05482

( * ) Notice: Subject to any disclaimer, the term of this patent is extended or adjusted under 35 U.S.C. 154(b) by 346 days.

(21) Appl. No.: 09/663,683

(22) Filed: Sep. 19, 2000

Related U.S. Application Data

(60) Provisional application No. 60/155,060, filed on Sep. 21, 1999.

(51) Int. Cl.$^7$ .................................................. F16L 55/00
(52) U.S. Cl. ..................... 15/104.04; 15/179; 15/176.1; 15/176.3; 15/176.6
(58) Field of Search ....................... 15/104.04, 104.095, 15/104.09, 179, 160, 202, 176.1, 176.3, 176.6

(56) References Cited

U.S. PATENT DOCUMENTS

| | | | |
|---|---|---|---|
| 2,469,821 A | * | 5/1949 | Galbraith ..................... 279/99 |
| 2,629,121 A | | 2/1953 | Petre |
| 2,866,212 A | | 12/1958 | White et al. |
| 3,118,162 A | | 1/1964 | Karr et al. |
| 3,188,674 A | * | 6/1965 | Hobbs .......................... 15/179 |
| 3,820,184 A | | 6/1974 | Stone |
| 4,433,448 A | | 2/1984 | True |
| 4,467,489 A | | 8/1984 | Begneaud |
| 4,862,549 A | | 9/1989 | Criswell et al. |
| D308,623 S | | 6/1990 | Nishiki |
| 5,307,534 A | | 5/1994 | Miller |
| D347,523 S | | 6/1994 | Villeneuve |

FOREIGN PATENT DOCUMENTS

| | | |
|---|---|---|
| CA | 831797 | 1/1970 |
| GB | 2147835 A | 5/1985 |

* cited by examiner

*Primary Examiner*—Robert J. Warden, Sr.
*Assistant Examiner*—Laura C Cole
(74) *Attorney, Agent, or Firm*—Richard C. Litman

(57) ABSTRACT

A pipe end cleaner device formed in a set of sizes to be mounted in the chuck of an electric drill for cleaning the ends of pipes in preparation for connections by threading or soldering. The cleaner device has a plurality of internal grooves configured and dimensioned to secure a conventional bristle brush having external grooves on its ring.

3 Claims, 2 Drawing Sheets

PIPE AND CLEANING DEVICE

CROSS-REFERENCE TO RELATED APPLICATION

This application claims the benefit of U.S. Provisional Patent Application Ser. No. 60/155,060, filed Sep. 21, 1999.

BACKGROUND OF THE INVENTION

1. Field of the Invention

The present invention relates to a cleaning device. More specifically, the invention is directed to a pipe end cleaning device holder used with a hand drill for preparing pipes for either a soldering or threading connection.

2. Description of the Related Art

The related art of interest describes various pipe cleaners, but none disclose the present invention. There is a need for a pipe cleaner utilizing a conventional manual wire brush to effect the cleaning of the ends of threaded pipes and copper pipes quickly for sweat soldering sleeve connections.

U.S. Pat. No. 5,307,534 issued on May 3, 1994, to Richard P. Miller describes a portable rotary copper pipe cleaner device. The device includes a rotary internal brush and reamer at one end and an external brush attached at an opposite end to chucks, powered by an internal variable speed electric motor and rechargeable batteries, and a manual switch on the cylindrical body. The device is distinguishable for its two brushing ends, when the present invention as a brush holder utilizes a known hand brush having a ribbed housing for external cleaning of a pipe.

U.S. Design Pat. No. 347,523 issued on Jun. 7, 1994, to Roger Villeneuve describes a manually operated rotary copper pipe cleaner including rotary internal and external brushes at opposite ends of a ribbed holder having a triangular cross-section. The device is distinguishable for requiring dual brushing ends.

U.S. Design Pat. No. 308,623 issued on Jun. 19, 1990, to Nobuo Nishiki describes a wire brush for attachment to a power tool comprising a hexagonal rear end section for fitting a chuck, a middle cylindrical section including an octagonal grip portion, and a cylindrical front end section including bristles directed longitudinally. The wire brush is distinguishable for its multi-faceted structure and the longitudinal arrangement of its wire bristles.

U.S. Pat. No. 2,866,212 issued on Dec. 30, 1958, to Maurice W. White et al. describes a rotatable pipe cleaning tool driven by a power drill comprising a cylindrical positioning roller on a spindle hinged to a yoke on a shaft of a cylindrical brush with copper or brass bristles. The tool with the brush either inside or outside a pipe with the roller applying pressure on the pipe. The tool is distinguishable for its requirement for a roller.

U.S. Pat. No. 3,118,162 issued on Jan. 21, 1964, to Alexander Karr et al. illustrates a wire brush stabilizer device for cleaning the scale from the sheets and beads of steam boiler fire tubes. The wire brush can be either cup-shaped or cylindrical with radially outwardly extending wire bristles. Each brush is on a threaded shaft with a ball threaded on the end. The brush can be inserted inside a pipe and rotated by a drill. The device is distinguishable for its required ball included structure.

U.S. Pat. No. 3,820,184 issued on Jun. 28, 1974, to John F. Stone describes a pipe cleaning device driven by a drill to clean only the outside of a pipe. A housing with a knob handle is attached to joined semi-annular elements having wire brush bristles extending radially inward. The housing includes a friction contact element on a drive shaft which rotates the wire brush. The device is distinguishable for its friction roller drive of a two-section collared brush unit.

U.S. Pat. No. 4,433,448 issued on Feb. 28, 1984, to Martin E. True is directed to an air powered pipe thread cleaner apparatus with a right-angled handle and having three adjustable brush bristles on arms rotatating in a cup-shaped housing for cleaning various sized pipes along with air and solvent. The apparatus is distinguishable for its pneumatic power and solvent use.

U.S. Pat. No. 4,467,489 issued on Aug. 28, 1984, to Donald M. Begneaud discloses a hand-held power brush pipe thread cleaner apparatus comprising six rotating brushes on a carriage inside a shroud fed by a cleaning fluid and pressurized air. The apparatus is distinguishable for its requirement for pressurized air and cleaning fluid.

U.S. Pat. No. 4,862,549 issued on Sep. 5, 1989, to Gerald W. Criswell et al. describes a pipe preparation device for soldering or brazing, having internal and external cleaning wired brushes, wherein the internal brush extends from a shell which can be driven by a motor powered drill or hand tools. The device is distinguishable for requiring the configuration of two wire brushes.

U.S. Pat. No. 2,629,121 issued on Feb. 24, 1953, to Severin W. Petre describes a rotatable brushing tool for cleaning pipe threads of drilling stems. A frusto-conical body having six rows of brushes made of metal, animal or synthetic material on the outside and inside is hand-driven by a crank. The body can have a spiral arrangement of the brushes on both sides. The tool is distinguishable for its frusto-conical structure with brushes on the outside and inside surfaces in either rows or spirals.

Canadian Patent No. 831,797 issued on Jan. 13, 1970, to Ernest C. Valentine describes a portable machine for fluid cleaning the inside and outside threads at the ends of oil well drill pipes by a petroleum distillate fed by a pump into a rotating brush holder in a cylindrical housing. The brushes are rotated by an electric drill at 100 rpm. The machine is distinguishable for its cleaning fluid integrated brushes.

U.K. Patent Application No. 2,147,835 A published on May 22, 1985, describes a hand tool for preparing pipe ends of two diameters, the tool having internal metal bristles housed in two adjoining housings with internal abrasive splined metal elements. The hand tool is distinguishable for its two-sided structure.

None of the above inventions and patents, taken either singly or in combination, is seen to describe the instant invention as claimed.

SUMMARY OF THE INVENTION

The invention is a cylindrical brush holding device to be rotated by a power drill for cleaning the ends of pipes in preparation for connections. The device has a holder element having an longitudinal axis, a smooth outer cylindrical surface, an inner ribbed cylindrical surface, an open front surface, and a rear wall having a polygonal aperture. The inner surface has a plurality of arcuate grooves disposed along the longitudinal axis of the brush holding element to interlock with a conventional cylindrical wire brush having matching ribs. A rod end having a polygonal cross-section is inserted in the aperture and fixedly held. A pair of set screws are positioned radially on the cylindrical brush element opposite each other and adapted to secure the wire brush. The polygonal rod is mounted in the chuck of an electric drill for rotating the cylindrical brush element around the end of a pipe to clean its end in preparation for joining by either threading or soldering a sleeve or elbow.

Accordingly, it is a principal object of the invention to provide a pipe end cleaning device.

It is another object of the invention to provide a pipe end cleaning device operable by a hand drill.

It is a further object of the invention to provide a pipe end cleaning device with internal ridges for holding a conventional cylindrical wire hand brush.

Still another object of the invention is to provide a copper pipe end cleaning device for cleaning the outside surfaces of pipes to be connected by threading or by a sleeve or elbow by soldering.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
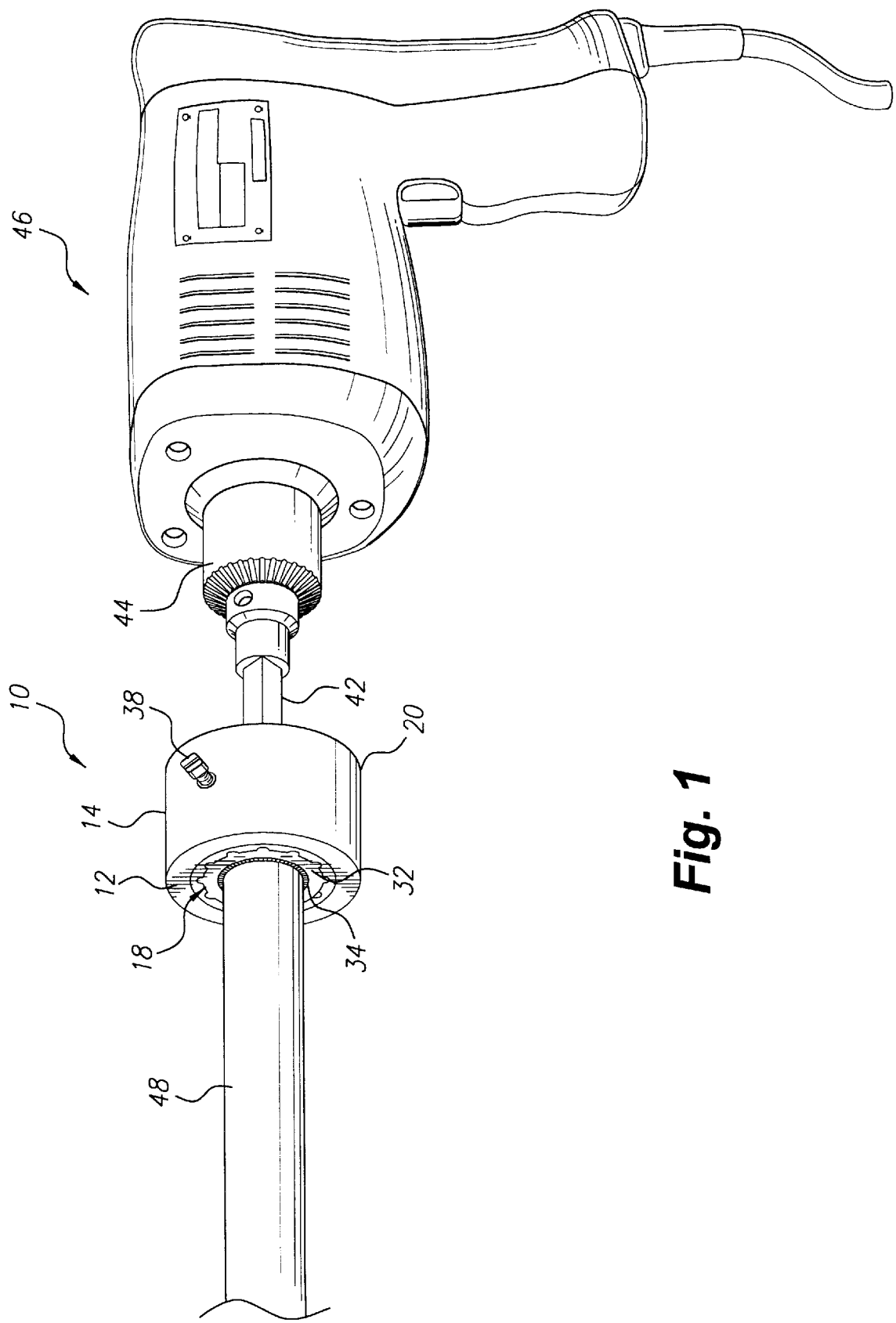
FIG. 1 is an environmental, perspective view of a pipe cleaning device according to the present invention, attached to a hand drill.
Figure 2:
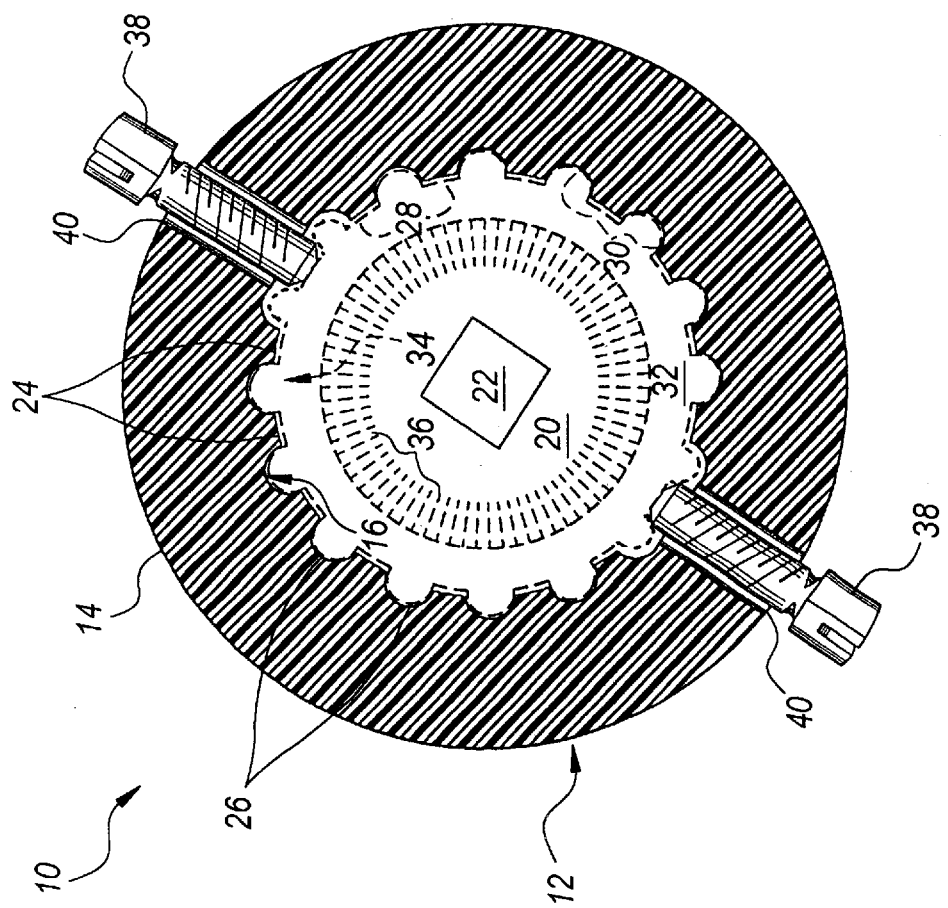
FIG. 2 is an enlarged scale, front elevational view of the brush holder and wire brush (in shadow) of the cleaning device.

The present invention illustrated in FIGS. 1 and 2 is directed to a pipe end cleaner device 10 comprising a cylindrical brush holder element 12 having a longitudinal axis, an outer smooth cylindrical surface 14, an inner ribbed cylindrical surface 16, an open front surface 18, and a rear wall 20 having a polygonal aperture 22. The inner surface 16 has a plurality of ribs 24 separated by arcuate grooves 26 equidistantly separated along the longitudinal axis for gripping purposes. The ribs 24 and arcuate grooves 26 of the brush holder element 12 frictionally interlock with, respectively, the grooves 28 and ribs 30 of the cylindrical brush ring element 32 of the conventional wire brush 34. Brush 34 has wire bristles 36 (in shadow in FIG. 2).

Two set screws 38 are positioned radially on the brush holder element 12 diametrically opposite each other in throughbores 40 to secure the brush ring element 32 and the brush 34.

A polygonal, e.g., square-shaped rod 42 is affixed to the square-shaped aperture 22 of the known brush 34. The rod 42 can alternatively have a pentagonal cross-section to enhance the grip by the chuck 44 of an electric drill 46 for rotating the device 10 around the end of a pipe 48. In this instance, a pentagonal aperture 22 in the rear wall 20 would be required for attachment to the brush holder element 12.

The brush holder element 12 can range in size proportional to the external diameters of conventional pipe brushes and pipes to form a set of brush elements. The pipe end cleaner device 10 can efficiently and economically clean pipe threads and ends of pipes by replacing the inserted worn brushes instead of the entire device.

It is to be understood that the present invention is not limited to the sole embodiment described above, but encompasses any and all embodiments within the scope of the following claims.

I claim:

1. A pipe end cleaner device comprising:

a cylindrical brush holder element having a longitudinal axis, an outer smooth cylindrical surface, an inner ribbed cylindrical surface having equidistantly spaced ribs, an open front surface, and a rear wall having a polygonal aperture;

said inner ribbed surface having a plurality of arcuate grooves separating the equidistantly spaced ribs disposed along the longitudinal axis of the brush holder element;

a rod having a polygonal cross-section to fit said polygonal aperture of said cylindrical brush holder element; and a pair of set screws positioned radially on said cylindrical brush holder element opposite each other and securing a ribbed brush ring element and securing therein having an internal peripheral wire brush;

whereby said rod can be inserted in an electric drill for rotating the cleaner device around the end of a pipe to clean threading or the external surface thereof for soldering.

2. The pipe end cleaner according to claim 1, wherein the polygonal aperture and rod are shaped with a square cross-sectional shape.

3. The pipe end cleaner according to claim 1, wherein the polygonal aperture and rod are shaped with a pentagonal cross-sectional shape.

* * * * *